US009348368B2

(12) United States Patent
Mitchell (10) Patent No.: US 9,348,368 B2
(45) Date of Patent: May 24, 2016

(54) ENTERTAINMENT APPARATUS (71) Applicant: VOXX INTERNATIONAL CORPORATION, Hauppauge, NY (US)

(72) Inventor: Ciaran Mitchell, Byfleet Surrey (GB)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 64 days.

(21) Appl. No.: 14/152,289

(22) Filed: Jan. 10, 2014

(65) Prior Publication Data

US 2014/0193142 A1 Jul. 10, 2014

(30) Foreign Application Priority Data

Jan. 10, 2013 (GB) .................. 1300456.9

(51) Int. Cl.
*H04N 5/77* (2006.01)
*G06F 1/16* (2006.01)
*B60R 11/02* (2006.01)

(52) U.S. Cl.
CPC .......... *G06F 1/1633* (2013.01); *B60R 11/0211* (2013.01)

(58) Field of Classification Search
CPC ....................................... H04B 1/082
USPC ........................................ 386/362
See application file for complete search history.

(56) References Cited

U.S. PATENT DOCUMENTS

2004/0227696 A1* 11/2004 Schedivy .................. 345/7

FOREIGN PATENT DOCUMENTS

| EP | 1 144 222 | 10/2001 |
| WO | 00/38951 | 7/2000 |
| WO | 2004/043049 | 5/2004 |
| WO | 2006/052282 | 5/2006 |

OTHER PUBLICATIONS

9 Inch Headrest DVD Player (CATEC) [Online] Available from: http://www.catecglobal.com/Car-seat-back-DVD-players-Car-headrest-DVD-players-for-Dodge-RAM-P-U-pickup-trucks-2010-2014_p595.html [Accessed Jul. 2, 2014].
EP 1144222 corresponds to WO 00/38951.
UK Search Report dated Jul. 4, 2014.
UK Examination Report Dated Nov. 23, 2015 Corresponding to British Patent Application 1300456.9.

* cited by examiner

*Primary Examiner* — Hung Dang
*Assistant Examiner* — Girumsew Wendmagegn
(74) *Attorney, Agent, or Firm* — F. Chau & Associates, LLC (57) ABSTRACT

An entertainment apparatus for a passenger of a vehicle is provided with a casing having a top edge region, a bottom edge region and two respective side edge regions interconnecting the top and bottom edge regions. The four such edge regions frame and define a front side of the entertainment apparatus, the front side being provided with a monitor screen. The apparatus plays optically-readable discs, and is provided with an opening in the bottom edge region of its casing for receiving and ejecting optically-readable discs in a generally vertical plane. The apparatus is adapted to be mounted to a more forward seat of a vehicle for use by a passenger when seated behind the more forward seat of the vehicle.

19 Claims, 8 Drawing Sheets

FIG. 14

ENTERTAINMENT APPARATUS

CROSS-REFERENCE TO RELATED APPLICATIONS

This application claims priority under 35 U.S.C. §119 to British Patent Application No. 1300456.9 filed on Jan. 10, 2013, the disclosure of which is incorporated by reference herein in its entirety.

TECHNICAL FIELD

This disclosure relates to an entertainment apparatus, and more particularly to an entertainment apparatus for use by a passenger in a vehicle.

DISCUSSION OF THE RELATED ART

Rear seat entertainment systems for cars (automobiles) typically include a monitor with a monitor screen, the angle of which is often adjustable, mounted to the rear of a more forward seat for viewing by a passenger seated behind that seat. The monitor may be mounted in the seat-back itself, in a headrest for that seat or otherwise mounted to the back of the seat, to the back of the headrest or from posts mounting the headrest.

Particularly when used in motor vehicles, passengers desire to use the rear seat entertainment system to play music or films. For this reason rear seat entertainment systems have been developed that can play optically-readable discs, such as CDs, DVDs or Blu-Ray® Discs, often of varying format selected by the passenger. In motor vehicles, an entertainment system typically includes an opening on the top, in the front face or in a side to receive said disc.

SUMMARY

According to an exemplary embodiment of the present invention, an entertainment apparatus includes a casing having a top edge region, a bottom edge region and two side edge regions interconnecting the top and bottom edge regions. The top edge region, the bottom edge region, and the two side edge regions frame and define a front side of the entertainment apparatus, and the front side includes a monitor screen. The entertainment apparatus is adapted to play an optically-readable disc, and includes an opening in the bottom edge region of the casing for receiving and ejecting the optically-readable disc in a substantially vertical plane. The entertainment apparatus is adapted to be mounted to a more forward seat of a vehicle for use by a passenger when seated behind the more forward seat of the vehicle.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

The expression "mounted to a more forward seat of a vehicle" (e.g., a front seat of a vehicle) as used herein is intended to encompass all or any of these possibilities. Similar such entertainment systems are incorporated in the seat backs of aircraft passenger seats and in the seat-backs on some railway passenger seats and seats in long distance coach transport vehicles, and this disclosure extends to these applications as well as to cars (automobiles).

An entertainment apparatus employed in a moving vehicle is subjected to acceleration forces and vibration and any mechanism associated with the loading, playing and ejection of optically-readable discs in such an apparatus should be capable of withstanding such operating conditions.

In accordance with an exemplary embodiment of the present disclosure, an entertainment apparatus for a passenger of a vehicle is provided with a casing having a top edge region, a bottom edge region and two respective side edge regions interconnecting the top and bottom edge regions, the four such edge regions framing and defining a front side of the entertainment apparatus, and the front side being provided with a monitor screen. The apparatus is adapted to play optically-readable discs, and is provided with an opening in the said bottom edge region of its casing for receiving and ejecting said optically-readable discs in a generally vertical plane. The apparatus is further adapted to be mounted to a more forward seat of a vehicle for use by said passenger when seated behind the said more forward seat of the vehicle.

A frictional disc holder is associated with said opening, the frictional disc holder including two members adapted to receive an optically-readable disc therebetween and to apply friction to a said disc when so received. The friction is sufficient to prevent the disc from falling out of the opening under the effect of gravity, but is insufficient to cause damage to a said disc or to prevent a said disc from being manually pushed past said members either for receipt in disc playing mechanism mounted within the said casing or to remove said disc from the apparatus upon ejection.

The said two members may be cut from a sheet of flexible material. The sheet of flexible material may be stamped from natural rubber or substitutes such as, for example, thermoplastic elastomer or from a sheet of foamed latex. Alternatively the two members may be shaped elastomeric members made from injection moulded thermoplastics.

The members, which may include a pair of wheels, may be spring loaded against each other. The wheels may be made from injection moulded thermoplastic elastomer or coated therewith, and at least one of the said wheels may be mounted on a spring arm. The wheels are positioned on either side of the opening, and may be positioned within the entertainment apparatus. The spring arms may be formed of, for example, steel.

The entertainment apparatus may incorporate speakers or be coupled by cable or wirelessly to external speakers mounted in the vehicle. Alternatively, the entertainment apparatus may include a connection suitable for use with headphones.

The casing of the entertainment apparatus may include a control panel for operating the entertainment apparatus. Alternatively, the monitor screen may incorporate touchscreen technology for operating the entertainment apparatus. The entertainment apparatus may be controlled from a remote control operated by the passenger or remote control buttons provided in the passenger's seat, in either case linked by, for example, cable, infra-red or wirelessly to the entertainment apparatus proper.

The disc playing mechanism is suitably supported within the casing of the entertainment apparatus by a frame. The frame may also be used as part of a fitting assembly adapted to fit the entertainment apparatus as a whole to the back of the more forward seat of the vehicle or its headrest, thereby providing an enhanced vibration proof mounting for the apparatus. The frame may be manufactured from, for example, folded steel.

The entertainment apparatus may adopt a slim profile with the disc playing mechanism located immediately behind the monitor screen (e.g., a flat LED, OLED or LCD screen) so that the entertainment apparatus may be mounted flat against the seat back or headrest back or partially inset into the seat back or headrest back while leaving the monitor screen and disc opening exposed.

Figure 8:
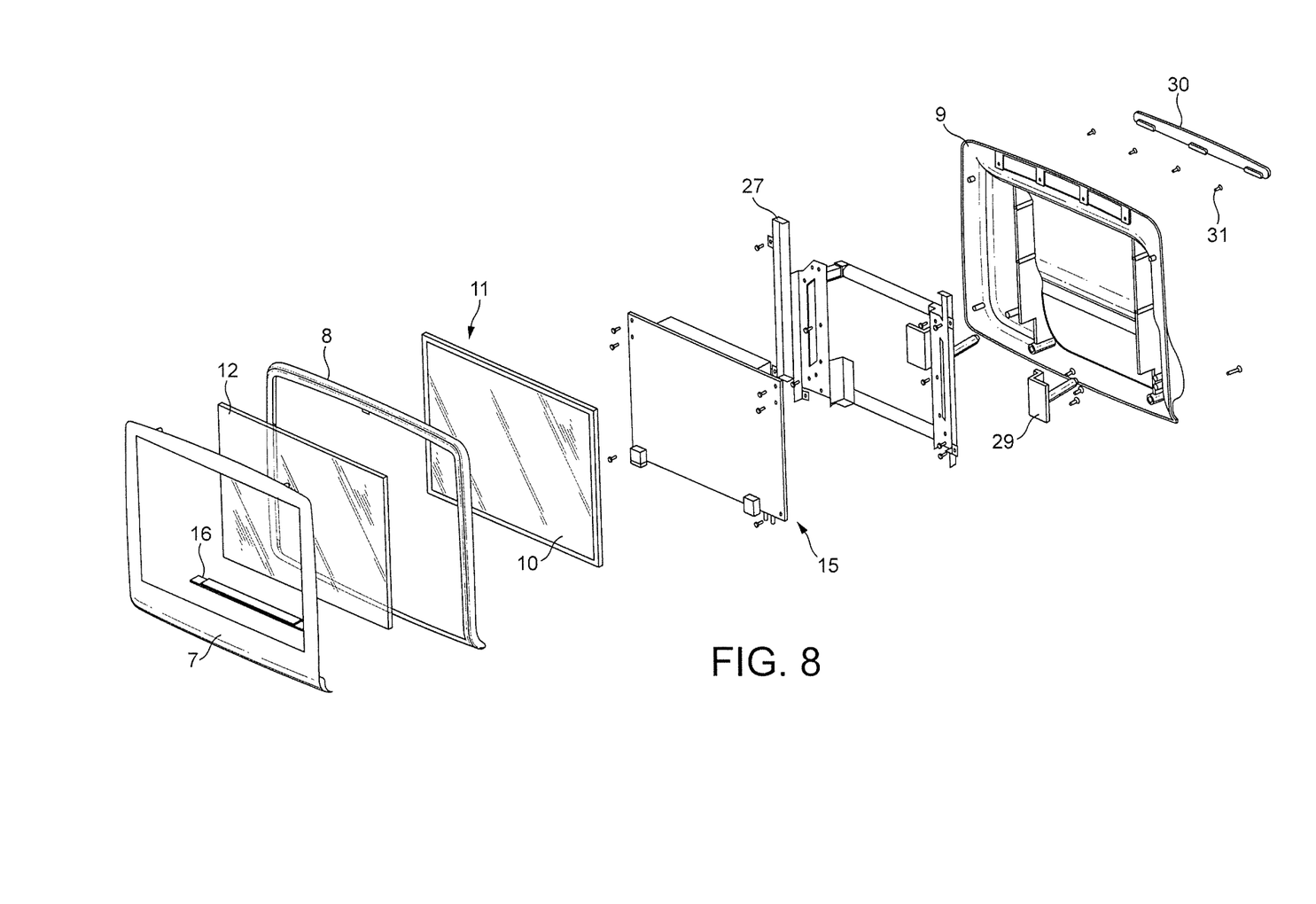
FIG. 8 is an exploded perspective view of the entertainment apparatus of FIGS. 1-7.

According to an exemplary embodiment, an entertainment apparatus 1 for a passenger of a vehicle includes a casing 2. The casing 2 has a top edge region 3, a bottom edge region 4 and two respective side edge regions 5 interconnecting the top and bottom edge regions 3 and 4. The four edge regions frame and define a front side 6. As shown in FIG. 8, the casing 2 may be formed in three separate parts, a front moulding 7, a bezel moulding 8 and a rear moulding 9.

Figure 12:
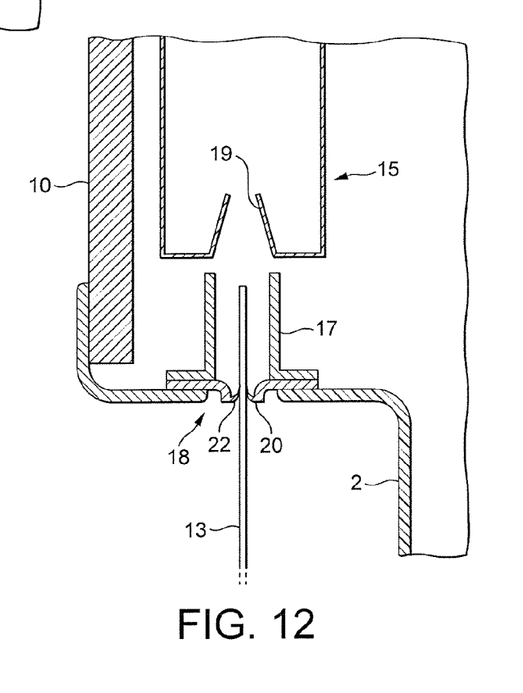
FIG. 12 is a sectional view similar to FIG. 10 for the embodiment of the frictional disc holder of FIG. 11.

A monitor screen 10 together with a touchscreen panel 11 and associated screen protector 12 (see FIG. 8) are provided in the front side 6 of the casing 2. The apparatus 1 is adapted to play optically-readable discs 13 (see FIGS. 10, 12 and 14). For this purpose the casing 2 is provided with an opening 14 in its bottom edge region 4 for receiving and ejecting the optically-readable discs 13 in a substantially vertical plane.

The monitor screen 10 may be a flat LED, OLED or LCD screen so that the apparatus may adopt a slim profile. Mounted within the casing 2, directly behind the screen 10, is a disc playing mechanism 15 (see FIG. 8). When inserted into the opening 14, a disc 13 is guided into the disc playing mechanism 15 by a disc guide 16. This disc guide 16 may include a pair of members 17 positioned on either side of the opening 14 within the housing 2 as shown in FIGS. 9 to 12. A frictional disc holder 18, which may be associated with the disc guide 16 (see FIGS. 9-12), or may serve both as a disc guide and a frictional disc holder (see FIGS. 13 and 14) is provided within opening 14.

Figure 10:
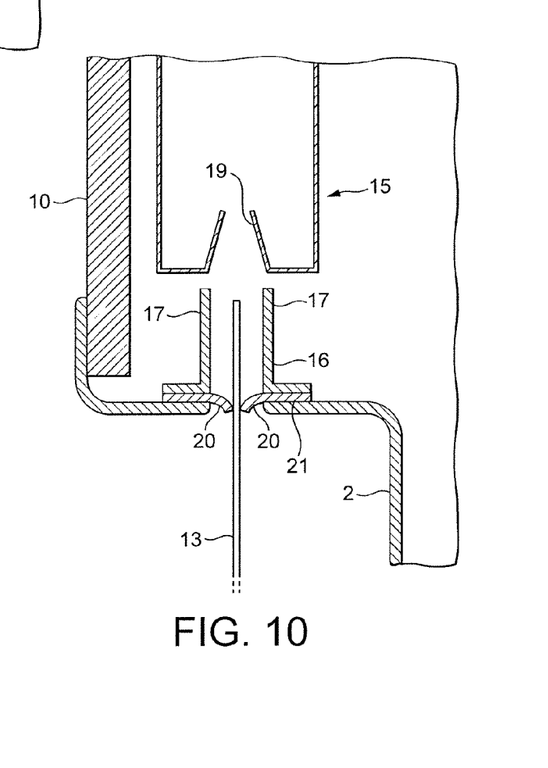
FIG. 10 is a sectional view similar to FIG. 9 with an optically readable disc frictionally held by said holder.
Figure 11:
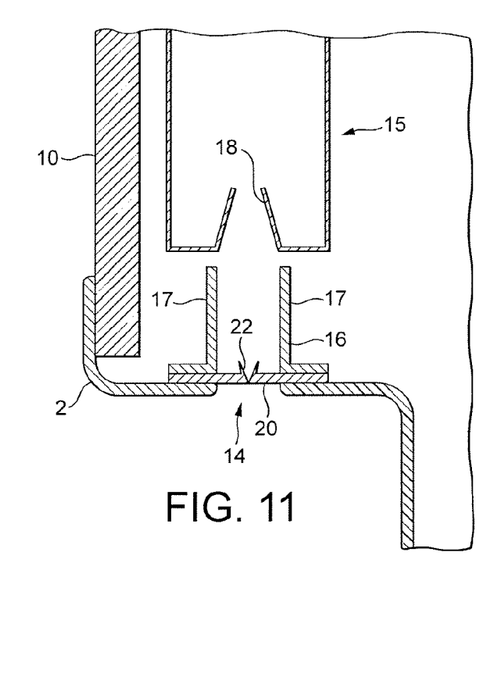
FIG. 11 is a sectional view similar to FIG. 9 showing an embodiment of the frictional disc holder.

The members 17 are suitably shaped and positioned to guide a disc 13 towards an open mouth 19 of the disc playing mechanism 15 as illustrated in FIG. 10.

Figure 9:
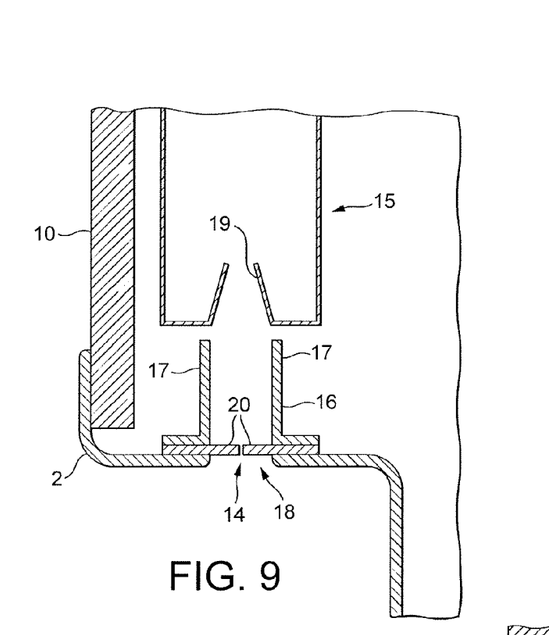
FIG. 9 is a sectional view showing an embodiment of a frictional disc holder mounted within a disc receiving opening of the apparatus of FIGS. 1-8.

In the arrangement illustrated in FIGS. 9 and 10, a frictional disc holder 18 is mounted between the disc guide 16 and confronting edge regions of the opening 14. The frictional disc holder 18 includes two members 20 adapted to receive a disc 13 therebetween and to apply friction to the disc 13 when so received. The members 20 are chosen so that the frictional force applied to a disc 13 inserted between the members 20 is sufficient to prevent the disc 13 from falling out of the opening 14 under the effect of gravity, as shown by FIG. 10 in which the disc 13 is unsupported except by the members 20, but insufficient to cause damage to the disc 13 or to prevent the disc 13 from being manually pushed past the members 20 either for receipt in the disc playing mechanism 15 of the apparatus 1 or to remove the disc 13 from the apparatus 1 upon ejection.

The two members 20 may be cut from a sheet of flexible material 21, the two edges of the material 21 abutting when no disc is present, as shown in FIG. 9, thereby sealing the disc playing mechanism from ingress of dust and dirt through the opening 14. The sheet of flexible material may be stamped from natural rubber or substitutes therefore such as, for example, a thermoplastic elastomer, or from a sheet of foamed latex. Alternatively the two members 20 may be formed from injection moulded thermoplastics with a shaped profile at their abutting edge region 22. It will readily be appreciated from FIGS. 11 and 12 that the extended edge region 22 provided on each member 21 where they abut provides an extended friction surface for contact with a disc 13.

Figure 13:
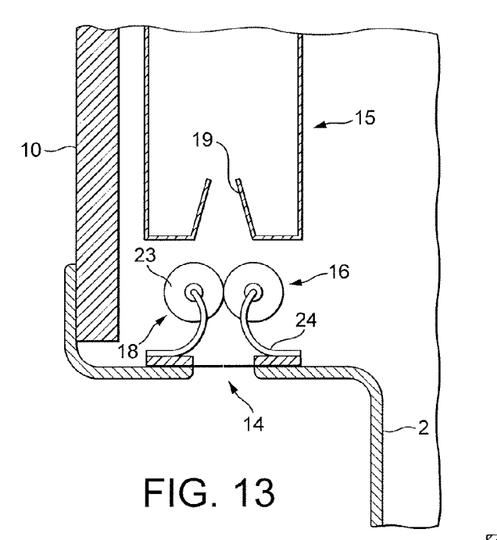
FIG. 13 is a sectional view similar to FIG. 9 showing an embodiment of the frictional disc holder.
Figure 14:
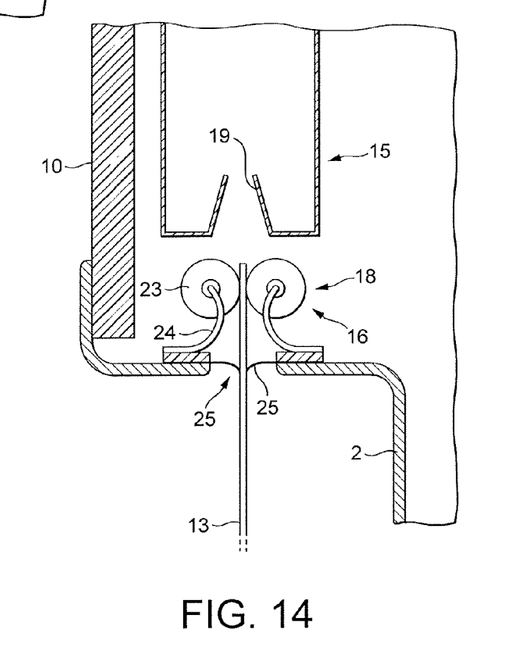
FIG. 14 is a sectional view similar to FIG. 10 for the embodiment of the frictional disc holder of FIG. 13.

In an exemplary embodiment, the frictional disc holder 18 includes a pair of wheels 23 spring loaded against each other as shown in FIGS. 13 and 14. The wheels 23 may be made from, for example, injection moulded thermoplastic elastomer or coated therewith and are mounted on spring arms 24 within the casing on either side of the opening 14. The spring arms 24 may be formed of, for example, steel. The frictional disc holder 18 may also act as the disc guide 16. The same effect may be achieved by mounting one of the wheels 23 on a fixed arm and the other wheel 23 on a spring arm 24. A dust cover 25 may also be provided to prevent dust from entering the apparatus 1. The dust cover 25 may be provided as a thinner version of the abutting members 20 of the arrangement of FIGS. 9 and 10.

Figure 1:
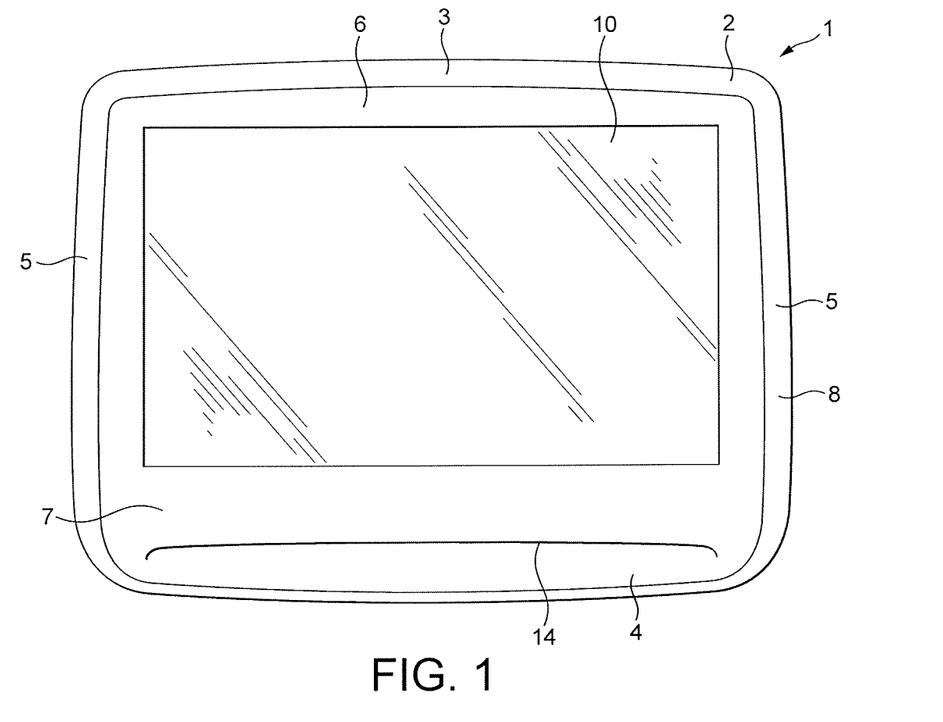
FIG. 1 is a front elevational view of an entertainment apparatus.
Figure 2:
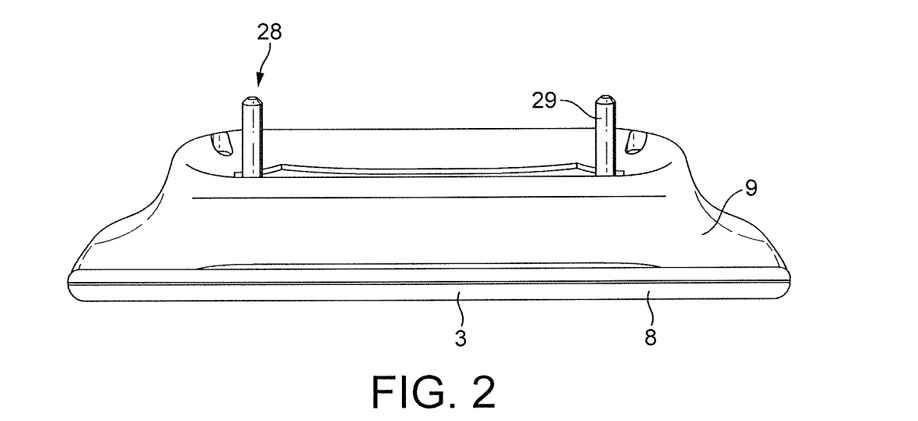
FIG. 2 is a top plan view of the entertainment apparatus of FIG. 1.
Figure 3:
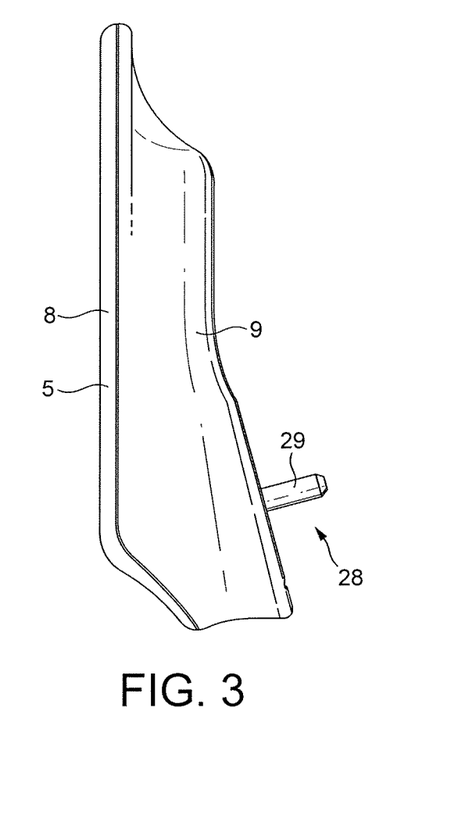
FIG. 3 is a side elevational view of the entertainment apparatus of FIGS. 1 and 2.
Figure 4:
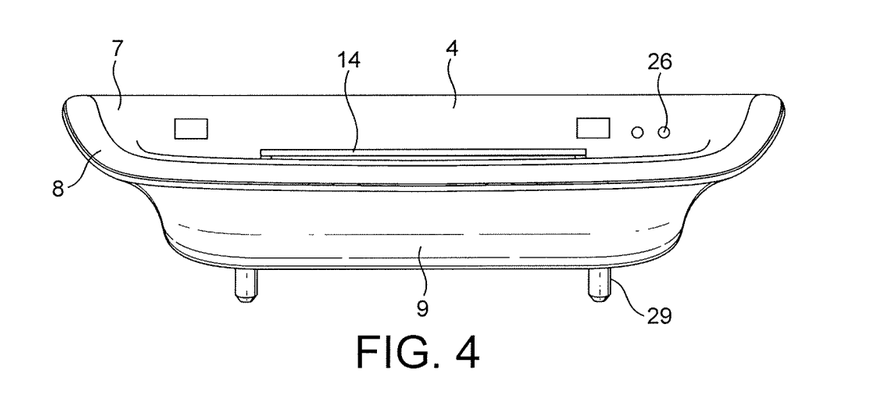
FIG. 4 is a bottom plan view of the entertainment apparatus of FIGS. 1-3.
Figure 5:
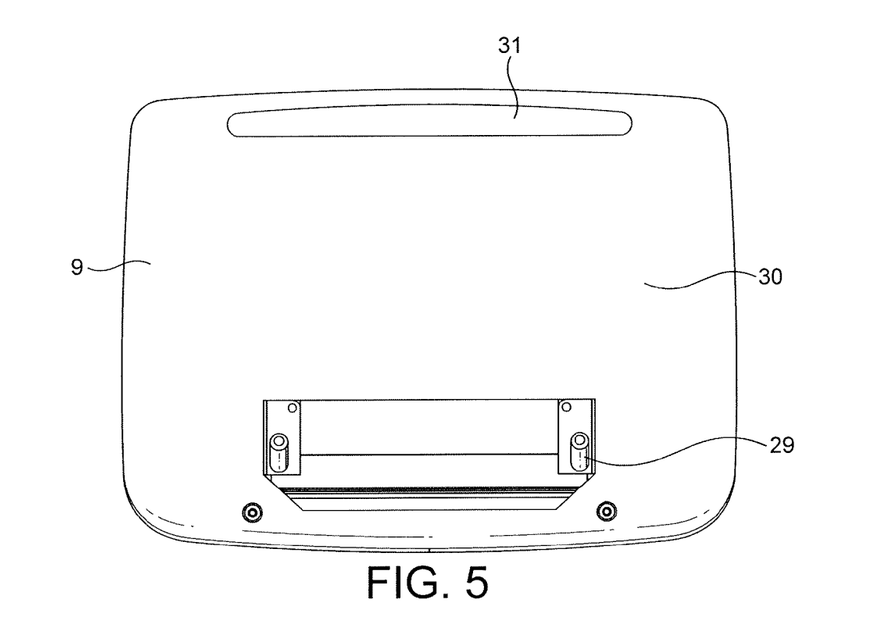
FIG. 5 is a rear elevational view of the entertainment apparatus of FIGS. 1-4.
Figure 6:
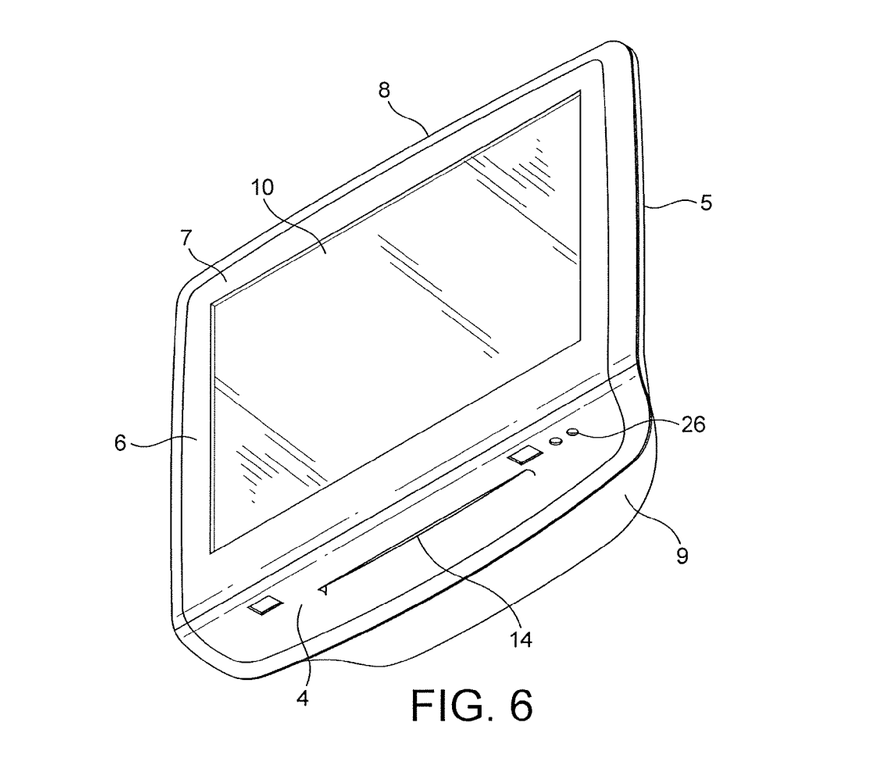
FIG. 6 is a perspective view of the entertainment apparatus of FIGS. 1-5 as seen from the front and below to one side.
Figure 7:
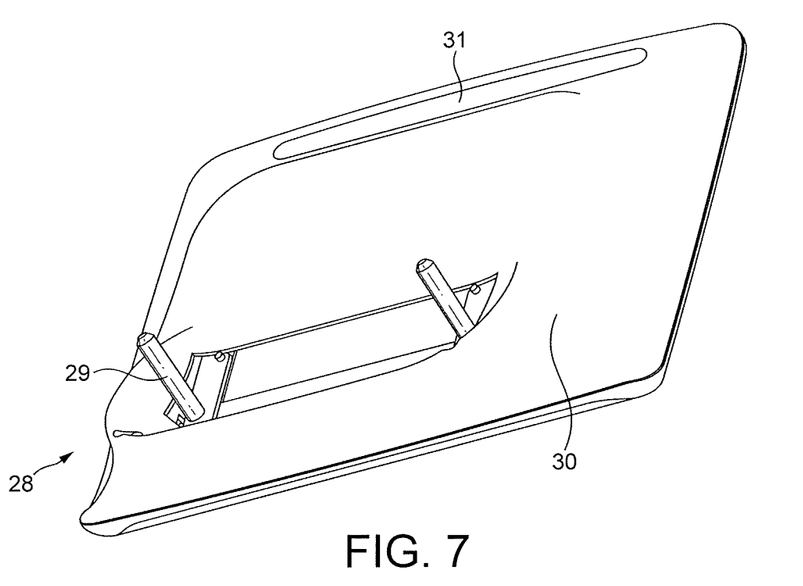
FIG. 7 is a perspective view of the entertainment apparatus of FIGS. 1-6 as seen from the rear and below to one side.

The entertainment apparatus 1 may incorporate speakers or be coupled by cable or wirelessly to external speakers mounted in the vehicle. Alternatively, as shown in FIG. 4, the entertainment apparatus may include a connection 26 suitable for use with headphones.

The entertainment apparatus may include a control panel for operating the entertainment apparatus. Alternatively, as shown in the exploded view of FIG. 8, the screen may incorporate touchscreen technology in the form of a touchscreen panel 11 for operating the entertainment apparatus.

The mechanical and electronic components of the disc playing mechanism 15 are suitably supported inside the casing 2 of the entertainment apparatus 1 by a frame 27. The frame 27 may also be used as part of a fitting assembly 28 adapted to fit the entertainment apparatus to the rear of a more forward seat of the vehicle, thereby providing an enhanced vibration proof mounting for the apparatus. The frame 27 may be formed of folded steel and associated with drawing bars 29 to which the frame 27 is bolted. The drawing bars 29 extend through an opening in the rear moulding 9 of casing 2 for insertion into cooperating receptacles fixed in the back of a vehicle seat or of a headrest therefore.

A cover 30 may be used to cover screws 31 employed to connect the front and rear mouldings 7 and 9 to each other.

Shorter passengers, such as children, seated in a rear passenger seat of a vehicle, may find it easier to insert an optically-readable disc into or remove an ejected disc from an entertainment apparatus when the opening for the disc is provided in a bottom region of the casing of the entertainment apparatus, in accordance with the exemplary embodiments. Provision of a suitable frictional disc holder associated within the opening for the disc in the casing ensures that a disc cannot simply fall out of the entertainment apparatus under its own weight. In addition, with the disc opening in the bottom edge region of the casing, there is less risk of dust and dirt reaching the disc playing mechanism.

Having described exemplary embodiments for an entertainment apparatus, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. An entertainment apparatus, comprising:
   a casing having a top edge region, a bottom edge region and two side edge regions interconnecting the top and bottom edge regions; and
   a frictional disc holder associated with an opening, wherein the frictional disc holder comprises two members adapted to receive an optically-readable disc therebetween and to apply friction to the optically-readable disc when received,
   wherein the friction is sufficient to prevent the optically-readable disc from falling out of the opening under the effect of gravity, and is insufficient to cause damage to the optically-readable disc or to prevent the optically-readable disc from being manually pushed past the two members either for receipt in a disc playing mechanism mounted within the casing or to remove the optically-readable disc from the entertainment apparatus upon ejection,
   wherein the top edge region, the bottom edge region, and the two side edge regions frame and define a front side of the entertainment apparatus, and the front side comprises a monitor screen,
   wherein the entertainment apparatus is adapted to play the optically-readable disc, and comprises the opening in the bottom edge region of the casing for receiving and ejecting the optically-readable disc in a substantially vertical plane,
   wherein the entertainment apparatus is adapted to be mounted to a more forward seat of a vehicle for use by a passenger when seated behind the more forward seat of the vehicle.

2. The entertainment apparatus of claim 1, wherein each of the two members is cut from a sheet of flexible material.

3. The entertainment apparatus of claim 2, wherein each of the two members is stamped from a sheet of natural rubber, a substitute therefor, a thermoplastic elastomer, or from a sheet of foamed latex.

4. The entertainment apparatus of claim 1, wherein the two members comprise shaped elastomeric members made from injection moulded thermoplastics.

5. The entertainment apparatus of claim 1, wherein the two members comprise a pair of wheels.

6. The entertainment apparatus of claim 5, wherein the wheels are made from injection moulded thermoplastic elastomer or coated therewith.

7. The entertainment apparatus of claim 1, wherein the two members are spring loaded against each other.

8. The entertainment apparatus of claim 5, wherein at least one of the wheels is mounted on a spring arm, and the wheels are positioned on either side of the opening within the entertainment apparatus.

9. The entertainment apparatus of claim 1, further comprising speakers.

10. The entertainment apparatus of claim 1, wherein the entertainment apparatus is coupled by cable or wirelessly to external speakers mounted in the vehicle.

11. The entertainment apparatus of claim 1, further comprising a headphones connection.

12. The entertainment apparatus of claim 1, wherein the casing comprises a control panel configured to operate the entertainment apparatus.

13. The entertainment apparatus of claim 1, wherein the monitor screen comprises a touchscreen configured to operate the entertainment apparatus.

14. The entertainment apparatus of claim 1, wherein the entertainment apparatus is configured to be controlled from a remote control operated by the passenger or remote control buttons provided in the passenger's seat, and the remote control and the remote control buttons communicate with the entertainment apparatus via a cable or a wireless connection.

15. The entertainment apparatus of claim 1, wherein the disc playing mechanism is supported within the casing by a frame.

16. The entertainment apparatus of claim 15, wherein the frame forms part of a fitting assembly adapted to fit the entertainment apparatus as a whole to a back of the more forward seat of the vehicle or a headrest of the more forward seat of the vehicle, thereby providing an enhanced vibration proof mounting for the entertainment apparatus.

17. The entertainment apparatus of claim 15, wherein the frame is manufactured from folded steel.

18. The entertainment apparatus of claim 1, wherein the entertainment apparatus adopts a slim profile with the disc playing mechanism located immediately behind the monitor screen, and the entertainment apparatus is mounted flat against a seat back or a headrest back of the more forward seat, or partially inset into the seat back or the headrest back, and the monitor screen and the opening are exposed.

19. The entertainment apparatus of claim 18, wherein the monitor screen comprises a flat LED, OLED or LCD screen.

* * * * *